(12) United States Patent
Bhattacharjee et al.

(10) Patent No.: US 6,685,989 B2
(45) Date of Patent: *Feb. 3, 2004

(54) ANTI-STATIC CLEANROOM PRODUCTS AND METHODS OF MAKING SAME

(75) Inventors: Himansu R. Bhattacharjee, Randolph, NJ (US); Edward Paley, Saddle River, NJ (US)

(73) Assignee: Illinois Tool Works, Inc., Glenview, IL (US)

(*) Notice: Subject to any disclaimer, the term of this patent is extended or adjusted under 35 U.S.C. 154(b) by 61 days.

This patent is subject to a terminal disclaimer.

(21) Appl. No.: 09/741,247

(22) Filed: Dec. 20, 2000

(65) Prior Publication Data

US 2001/0000769 A1 May 3, 2001

Related U.S. Application Data

(62) Division of application No. 08/999,984, filed on Nov. 13, 1997, now Pat. No. 6,235,660, which is a continuation of application No. 08/616,249, filed on Mar. 15, 1996, now Pat. No. 5,736,469.

(51) Int. Cl.$^7$ ................................................. B05D 1/18
(52) U.S. Cl. .................................................... 427/430.1
(58) Field of Search ..................................... 427/430.1

(56) References Cited

U.S. PATENT DOCUMENTS

| 4,336,685 A | 6/1982 | Eisenstein |
| 4,422,483 A | 12/1983 | Zins |
| 4,699,804 A | 10/1987 | Miyata et al. |
| 4,803,096 A | 2/1989 | Kuhn et al. |
| 4,840,202 A | 6/1989 | Feustel et al. |
| 4,888,229 A | 12/1989 | Paley et al. |
| 4,933,109 A | 6/1990 | Yamada et al. |
| 4,975,317 A | 12/1990 | Kuhn et al. |
| 4,981,718 A | 1/1991 | Kuhn et al. |
| 5,030,508 A | 7/1991 | Kuhn et al. |
| 5,041,319 A | 8/1991 | Becker et al. |
| 5,071,699 A | 12/1991 | Pappas et al. |
| 5,093,190 A | 3/1992 | Kwok et al. |
| 5,151,321 A | 9/1992 | Reeves et al. |
| 5,229,181 A | 7/1993 | Daiber et al. |
| 5,271,995 A | 12/1993 | Paley et al. |
| 5,324,579 A | 6/1994 | Sassa et al. |
| 5,405,681 A | 4/1995 | Nakayama et al. |
| 5,407,699 A | 4/1995 | Myers |
| 5,460,655 A | 10/1995 | Pisacane et al. |
| 5,494,609 A | * 2/1996 | Kulkarni et al. ............ 252/500 |
| 5,736,469 A | * 4/1998 | Bhattacharjee et al. .... 15/209.1 |

FOREIGN PATENT DOCUMENTS

DE          3834526          4/1990

* cited by examiner

Primary Examiner—Michael Barr
(74) Attorney, Agent, or Firm—Kramer Levin Frankel and Naftalis LLP; Gregor N. Neff

(57) ABSTRACT

Anti-static cleanroom products having a coating of conductive polymeric particulates which decreases the surface resistivity of the products. Preferably, the particulates are pyrrole polymers. The anti-static properties are achieved by depositing conductive polymer particles onto the non-conductive substrate surface. The anti-static products include cleanroom wipers, stationery products (notebooks and writing instruments), garments and swabs (polyurethane foam tipped). The cleanroom stationery products include notebooks comprising polyethylene impregnated with silica. The invention also includes anti-static plastic gloves.

7 Claims, 2 Drawing Sheets

ANTI-STATIC CLEANROOM PRODUCTS AND METHODS OF MAKING SAME

This application is a division of prior application Ser. No. 08/999,984, filed on Nov. 13, 1997, by H. R. Bhattacharjee, et al., now U.S. Pat. No. 6,235,660 and currently entitled ANTI-STATIC CLEAN ROOM PRODUCTS AND METHODS OF MAKING SAME which is a continuation of application Ser. No. 08/616,249, filed Mar. 15, 1996, now U.S. Pat. 5,736,469.

BACKGROUND OF THE INVENTION

1. Field of the Invention

This invention relates generally to the prevention of particulate contamination and static-discharge in cleanrooms. More specifically, this invention relates to anti-static products used in "cleanrooms", semiconductor fabrication plants, pharmaceutical manufacturing facilities, and other applications and environments where extreme cleanliness must be maintained, and to methods for making such products.

2. Description of the Related Art

Cleanrooms are being used more often in a greater variety of areas. The requirements for maintaining cleanliness in semiconductor fabrication cleanrooms, pharmaceutical manufacturing facilities and similar facilities, for example, are stringent. Products brought into and used in cleanroom environments must be carefully designed and manufactured to avoid the risk of contamination. In semiconductor fabrication cleanrooms, for example, surfaces frequently must be wiped with exceptionally clean wipers and cleaning solution in order to prevent contamination. Other examples of cleanroom products include clothing, gloves and stationery products (i.e., notebooks and writing instruments).

It is well known that particulates can be brought into the cleanroom environment by workers themselves and by the materials which they use. In this regard, items which are subject to abrasion or wear are a cause of special concern since such abrasion and wear can result in particle formation. Cleanrooms are characterized by a special emphasis on the prevention of particulate generation and the removal thereof prior to deposition on cleanroom surfaces and products.

The term "applicator" or "wiper", as used in this specification, is intended to mean a cleaning fabric suitable for use in cleaning surfaces in cleanrooms and the like. Such applicators or wipers are distinguished from tissues and similar materials in that they are extremely clean and have a relatively high degree of wet strength and structural integrity. Accordingly, these products do not disintegrate when used to wipe surfaces, even when dampened or saturated with cleaning liquids.

Cleanroom products used in sensitive areas, such as semiconductor fabrication cleanrooms and pharmaceutical manufacturing facilities, are carefully selected for characteristics such as particle emission levels, levels of ionic contaminants, adsorptiveness, resistance to attack or degradation by wear or exposure to cleaning materials, and lack of attack by or degradation by biocides.

The contamination which is to be controlled is often called "microcontamination" because it consists of small physical contaminants, such as particulate matter of a size between that of bacteria and viruses, and chemical contaminants in very low concentrations, typically measured in parts per million or parts per billion.

The contaminants usually are of three types including (1) particles, (2) ions and (3) "extractables", which are impurities leached from the fibers of the wiper, for example.

Loose particles 100 micrometers and smaller in size are an anathema to obtaining high production yields and reliable semiconductor devices. Therefore, wipers, cleaning materials and other products used in cleanrooms should emit as small a number of loose particles as possible. Similarly, ions and "extractables" are to be minimized since each interferes with the exacting process of semiconductor manufacturing.

Such requirements have been met by the provision of specially fabricated products designed to emit very few loose particles or ions, while maintaining structural integrity when used. For example, cleanroom wipers that are wetted with cleaning solution and used to wipe the surfaces to be cleaned.

Various cleanroom products have been developed for use in cleanroom environments. See, for example, U.S. Pat. No. 4,888,229 to Paley et al.; U.S. Pat. No. 5,229,181 to Daiber et al.; and U.S. Pat. No. 5,271,995 to Paley. The disclosures of those patents hereby are incorporated herein by reference.

However, in some cleanroom environments, not only is it necessary to maintain a "clean" environment, it is often also necessary to prevent static discharge. The problem of static electricity has become an ever increasing problem where, for example, sensitive electronic equipment is being manufactured. Basically, static is created when two similar materials are rubbed together and then separated. One object tends to give up electrons whereas the other tends to accumulate them, thereby leaving the former with a positive static charge and the latter with a negative charge. When oppositely charged objects contact each other, a static shock is created which corrects the imbalance.

Control of static electricity can be critical in many industrial or commercial settings where an undesired electrostatic discharge (ESD) or spark can result in serious damage. For example, in explosive environments such as in grain elevators or in flammable environments such as an oil drilling rig or refinery, a spark can be extremely dangerous. In addition, static discharge can damage sensitive integrated circuits. Therefore, such circuits must be safeguarded during their manufacture.

One particularly significant problem is the fact that the average person will not sense a discharge of less than 3500 volts. Since many electronic devices can be damaged by potentials far lower than 3500 volts, such devices can be damaged unknowingly and incorporated into the final product. As a result, the final product will be defective, without anyone knowing it.

Insulating materials can often be a source of static discharge, particularly those having a relatively high value of surface resistance on the order of $10^{16}$ Ω (Ohms). Such insulated materials should be modified to reduce the risk of static discharge. In the past, this has been accomplished by increasing the electrical conductivity of the products. Such an increase in conductivity allows the product to dissipate the static electrical buildup.

Some prior anti-static cleanroom wipers have been made by incorporating fibers having a higher degree of electrical conductivity. Certain types of carbon and metal fibers are inherently conductive, and therefore the incorporation of such fibers increases the conductivity of the textile material so that the previously static materials can be rendered static dissipative. U.S. Pat. No. 5,324,579 to Sassa et al. discloses a non-woven textile material made useful for dissipating static electric charges by incorporating an electrically conductive fiber.

However, the use of such fibers has many disadvantages. For example, the conductive fibers only allow for increasing conductivity in the direction of the fiber. Accordingly, the resultant product would have different conductivities in different areas and in different directions. Furthermore, such conductive fibers may be relatively brittle when compared to the majority of fibers used in a wiper product and therefore have a tendency to break when flexed. Such breakage not only results in a reduction in the static dissipative capability of the material, but also provides a source of contamination to the cleanroom environment.

OBJECTS OF THE INVENTION

It is an object of the present invention to solve or alleviate the foregoing problems.

Accordingly, it is an object of the invention to produce cleanroom products, particularly cleanroom wipers, that can dissipate electrostatic discharge while maintaining suitability for use in cleanroom environments.

In particular, it is an object to provide cleanroom products such as wipers which have relatively uniform anti-static properties, without degradation of the cleanroom quality of the products.

It is a further object of the present invention to provide such cleanroom products and manufacturing methods which are relatively simple and inexpensive to make and use.

The foregoing and other objects and advantages of the invention will be set forth in or apparent from the following description and drawings.

SUMMARY OF THE INVENTION

In accordance with the invention, cleanroom products are provided with a coating of conductive polymeric particulates. The particulates decrease the surface resistivity of the products to give them anti-static characteristics, without degrading the cleanroom properties of the products.

Preferably, the particulates are pyrrole polymers. The anti-static properties are achieved by depositing conductive polymer particles onto the non-conductive substrate surface. Preferably the coating consists of particles spaced relatively widely from one another, covering less than 75% of the area of the surface to which they adhere.

The anti-static cleanroom products include wipers, stationery products (notebooks and pens), garments, and swabs (i.e., polyurethane foam tipped swabs). The cleanroom stationery products also include notebooks comprising polyethylene impregnated with silica. The garments include anti-static plastic gloves.

DESCRIPTION OF PREFERRED EMBODIMENTS

Figure 1:
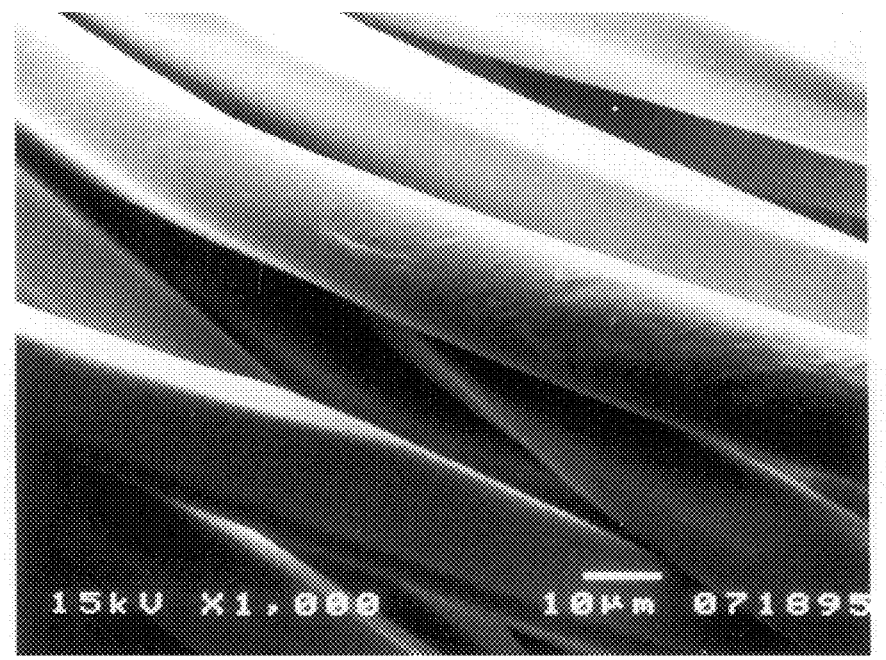
FIG. 1 depicts a scanning electron micrograph ("SEM") of untreated nylon fibers.

The presently disclosed anti-static cleanroom products provide for the dissipation of static electric charge without degrading their cleanroom qualities. This is achieved by applying conductive polymer particulates onto the insulative surface of the product. Surprisingly, the conductive particulate polymeric coatings, even though in particulate form, do not degrade the cleanroom properties. It has been discovered that such particulates can be formed on the cleanroom product and are not easily removed. Accordingly, such coatings do not provide a significant source of "loose particle" contamination.

Additionally, it has been found that the particulate coating, even though not covering the entire product with either a uniform or coherent film, provides for increased dissipative qualities. A continuous and coherent coating of the particulates is not required and is, in fact, avoided using the present invention. Furthermore, it has been found that the coating results in relatively uniform surface resistivities in multiple directions.

The anti-static properties for the wiper are achieved by depositing conductive polymer particles onto the non-conductive fibers that make up the wiper. The polymer particles decrease the resistivity of the wiper from approximately $10^{14}\Omega$ to approximately $10^8$ $\Omega$ ohms per square cm. Preferably, the resistivity of the final product is from $10^5$ to $10^{11}\Omega$. If the resistivity is greater than $10^{12}\Omega$ there will be no charge dissipation. However, if the resistivity is too low (i.e., the wiper is too conductive) harmful sparks can result between a surface and the wiper. Therefore, it is important that the resistivity of the resultant wiper is between about $10^5$ to $10^{11}\Omega$.

The wiper product is made, for example, by contacting an untreated wiper with an aqueous solution containing polymerizable monomers, an oxidizing agent and a counter ion. Suitable monomers include aniline and pyrrole. The monomer is preferably pyrrole. Suitable oxidizing agents include ferric chloride and potassium persulfate. Suitable counter ions include 2,6-Napthalenedisulfonic acid, disodium salt and benzenesulfonic acid, sodium salt.

According to one embodiment of the invention, an ESD dissipative wiper is prepared by adding a counter ion and an oxidizing agent in an aqueous solution at room temperature and mixing. Subsequently, a monomer solution is added to the mixture and mixed. After sufficient mixing, uncoated cleanroom wipers are added to the solution and mixed. The wipers are subsequently removed, rinsed and dried to result in anti-static cleanroom wipers.

The time for treatment can range from about 0.5 hour to about 2 hours, preferably about 1 hour to about 1.75 hours. The time of treatment can be varied to an even greater extent, for example, by varying the concentration of reactants in solution, the amount of wipers added to the solution, the temperature of reaction and the amount of agitation.

The temperature of treatment is preferably room temperature, although it can be varied if necessary. The concentration of the oxidizing agent, counter ion, monomer and uncoated product in the mixing solution can also be varied and adjusted by one skilled in the art without undue experimentation to result is a varying degree of resultant conductivity for the product.

The resultant cleanroom product has irregular and non-uniform polymeric particles deposited onto the surface. The polymeric particles are deposited onto the substrate to form an irregular coating. Preferably, the particulate coating covers less than 75% of the substrate surface, more preferably less than 50%, even more preferably less than 25% and most preferably less than 10%. The embodiments of the invention include applying such coatings of conductive polymer particulates to cleanroom wipers, gloves and garments. Additionally, the invention includes applying such particulates to plastic gloves.

What is particularly surprising in the cleanroom wiper and the other cleanroom applications is that the effect of these particles is sufficient to decrease the resistivity of the product enough to provide the anti-static properties. This is the case even though the particulate coating is non-uniform. Also surprising is the discovery that the particulates adhere strongly to the substrates so they do not detrimentally reduce the "cleanroom" properties of the products by becoming dislodged upon exposure to cleaning solvents and/or during use. The particles are not dislodged in any significant amount, even by washing the wiper.

Preferably, the particle counts of the resultant anti-static cleanroom product is less than 30 million per square meter, more preferably less than 20 million, even more preferably less than 15 million and most preferably less than 10 million.

Preferably, the non-volatile residue in deionized water is less than 0.50 g/meter$^2$, more preferably less than 0.25 g/meter$^2$, even more preferably less than 0.15 g/meter$^2$ and most preferably less than 0.10 g/meter$^2$. Preferably the ion concentration is less than 20 ppm, more preferably less than 10 ppm, even more preferably less than 5 ppm, and most preferably less than 1 ppm.

Some of the wiper fabrics which have been successfully used in such cleanroom applications and may be rendered anti-static include knitted, woven and non-woven fabrics such as the following:

1. 100% polyester or nylon, preferably knitted from continuous filament yarn. Typical products are sold under the trademarks "AlphaWipe"; "AlphaSorb"; and "Alpha10"; or "MiracleWipe" by the Texwipe Company, Upper Saddle River, N.J. Woven polyester or nylon fabrics also can be used.
   Some of such fabrics are sealed along the edges, in the manner described in U.S. Pat. No. 4,888,229.
2. 100% spun bond polypropylene. The fibers of these fabrics are arranged randomly and are bound together by heat or chemical action. A typical product using this construction is sold under the trademark "PolySat" by the Texwipe Company.
3. 55% cellulose and 45% polyester fiber or 100% polyester bound together by hydroentanglement. A typical product is the Texwipe "TechniCloth" product.
4. 100% polyurethane foam.
5. Other fabrics made of rayon, acrylic, abaca, (e.g., "M-Wipe" wipers sold by Texwipe), hemp, cotton, etc.

EXAMPLES

The following examples are illustrative of some of the products and methods of making the same falling within the scope of the present invention. They are, of course, not to be considered in any way limitative of the invention. Numerous changes and modification can be made with respect to the invention including the selection of the fiber materials, solvents, monomers, oxidizing agents, doping agents, ranges of proportions, time and temperature during operation and the like.

Example 1

300 mL of deionized water was placed in a 1.5 L beaker. The beaker placed on the platform of an orbital shaker running at a speed of 150 rpm. 2.0 g of benzenesulfonic acid, sodium salt and 2.8 g of ferric chloride were slowly added into the beaker after both ingredients were predissolved separately in 50 mL water. Immediately after the additions, 0.5 g of neat pyrrole (non-diluted) was added dropwise into the beaker. While the shaker was still running, 12.2 g of polyester wiper material was added to the beaker. The total weight represented two 9"×9" sealed-edge double-knit wipers constructed from 100 percent continuous filament textured polyester.

The reaction was run for two hours at room temperature. Initially the color of the white wipers changed to light yellow and then gradually changed to grayish black. At this stage, the wipers were taken out from the beaker and placed in a separate clean beaker. The wipers were then rinsed several times with deionized water containing a surfactant (Triton-X®) and left to dry overnight in a laminar flow cleanroom workstation.

The resultant dried products were tested for resistivity. The surface resistivity of the coated dry wipers was reduced from an original $10^{+14}\Omega$ to $10^{+5}\Omega$ in all directions when measured by a surface resistivity meter obtained from Static Control Services. The tremendous reduction in resistivity suggested that the wipers acquired excellent electrostatic discharge (ESD) dissipative properties.

Example 2

To determine the contamination characteristics of the electrostatic discharge (ESD) dissipative wipers, additional wipers were produced using procedures similar to Example 1 with the following changes:

The steps in Example 1 were repeated except that the reaction was conducted in a clean stainless steel tray (size 11¾"×9½"×3¾"). The contamination characteristics such as particles, non-volatile residues, and ions, of the original wipers were determined by usual laboratory test procedures prior to coating. After the coating treatment, the same parameters were evaluated in order to determine the extent of any increase in contamination that may have occurred as a result of the process.

Accordingly, 800 mL of deionized water was placed in the steel tray. The tray was placed on the platform of the orbital shaker and the shaker was allowed to run at 150 rpm. Four grams of benzenesulfonic acid, sodium salt (predissolved in 100 mL water), five grams of ferric chloride (predissolved in 100 mL water), and, lastly, 1 mL of neat pyrrole were consecutively added into the tray containing the water. The pyrrole was added dropwise. Immediately after these additions, six pieces of 9"×9" polyester wipers and two pieces of 4"×4" nylon wipers (total weight 37 g), were gently draped on the surface of the solution. The shaker was run for 30 minutes, at which time both of the nylon wipers turned grayish black whereas the polyester wipers turned light gray.

The nylon wipers were taken out and placed in a beaker and rinsed several times with deionized water and surfactant solution (Triton-X®). Meanwhile, the polyester wipers were allowed to run for additional time for a total of 2 hours, at which point, they turned grayish black. The polyester wipers were rinsed in the same manner as the nylon wipers. Both sets of wipers were dried overnight at room temperature by hanging them in a cleanroom workstation. The resistivities of the dry wipers were measured using the same procedure set forth in Example 1. Both types of wipers had excellent ESD dissipative properties. The coated nylon wipers had a resistivity of $10^{+6}\Omega$ and the polyester wipers had resistivities from $10^{+8}\Omega$ to $10^{+9}\Omega$. Before the application of the coatings all of the wipers had resistivities ranging from $10^{+13}\Omega$ to $10^{+14}\Omega$ (insulative).

Both wiper materials were tested for the particle release counts by using a HIAC/ROYCO Liquid Particle Counter and by using the RP-4 test procedure as recommended by the Institute of Environmental Sciences. The particle counts of the treated wipers were under 10 million per square meter and, hence, are suitable for cleanroom wiping applications. Non-Volatile Residue (NVR) was also determined in deionized water for both types of wipers and the numbers recorded were found to be within the range for cleanroom applications (0.10 to 0.15 g/meter$^2$). Ions such as sodium and chloride were also determined by Atomic Absorption (AA) Spectroscopy and by Ion Specific Electrode (ISE), respectively. The sodium concentration was in the range of 1 ppm and the concentration of chloride was 26.5 ppm (high). The coated wipers were also tested by being placed in an aqueous solution or in isopropyl alcohol solution for several days to determine the strength of the particulate adhesion. It was found that the particulates adhered to the substrate even after several days of exposure.

Example 2 provided three important findings. First, nylon material coats more rapidly than polyester in this process (in terms of time needed for the application of the coating). Second, ferric chloride should be avoided as the oxidizing agent if chloride concentration is a concern since it causes the higher chloride contamination in the product. Third, the resultant particulate coating adheres strongly to the fibers.

Example 3

The procedure of Example 2 was repeated except the contents of the steel tray as shown in Example 2 were changed as follows:

a. 900 mL deionized water b. 0.5 g of 2,6-Napthalenedisulfonic acid, disodium salt as the doping agent predissolved in 50 mL water c. 0.5 g of Potassium persulfate as the oxidizing agent predissolved in 50 mL water d. 1 mL of neat pyrrole added dropwise e. and 4 pieces of 9"×9" nylon wipers.

The reaction was run at room temperature. The entire content of the tray was allowed to shake on an orbital shaker for 30 minutes. The resultant products were grayish black wipers. The wipers were taken out and rinsed several times with deionized water containing surfactants and allowed to dry. The dried wipers were tested and found to be as clean as those prepared in Example 2, including a substantial reduction in chloride content. The resistivity was tested and determined to be in the range of $10^{+6}\Omega$. The chloride content in these wipers was low and quantified by Capillary Ion Analysis (CIA) technique to be lower than 1 ppm. Accordingly, ferric chloride was replaced with potassium persulfate as the oxidizing agent for all the subsequent runs.

Example 4

Figure 2:
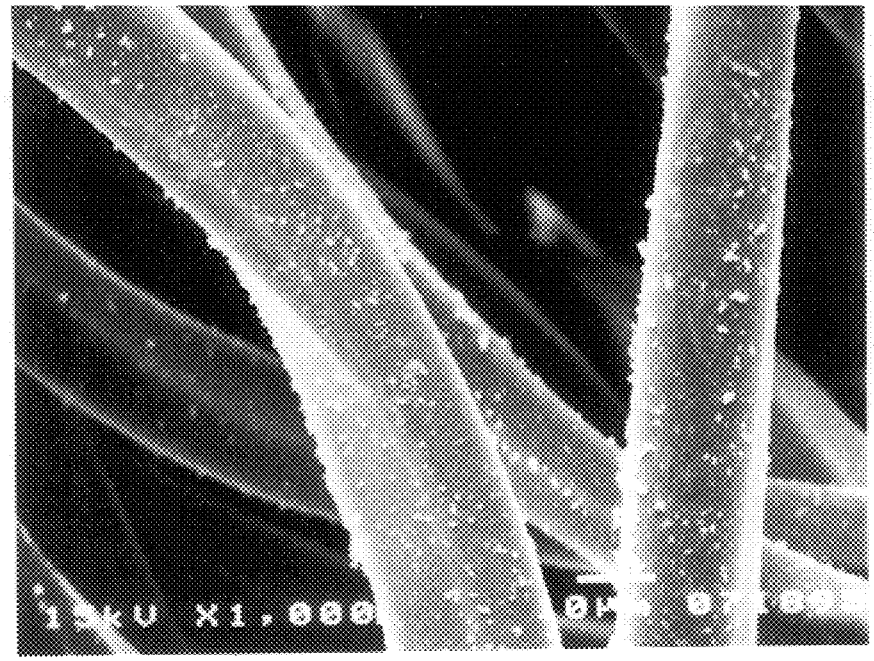
FIG. 2 depicts a SEM of nylon fibers coated with pyrrole polymer particulates.
Figure 3:
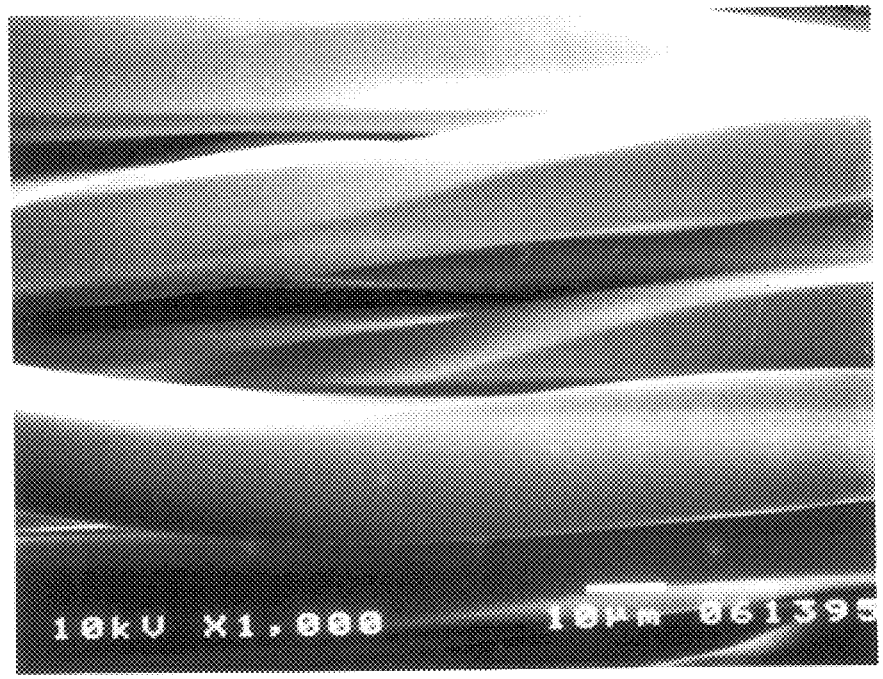
FIG. 3 depicts a SEM of untreated polyester fibers.
Figure 4:
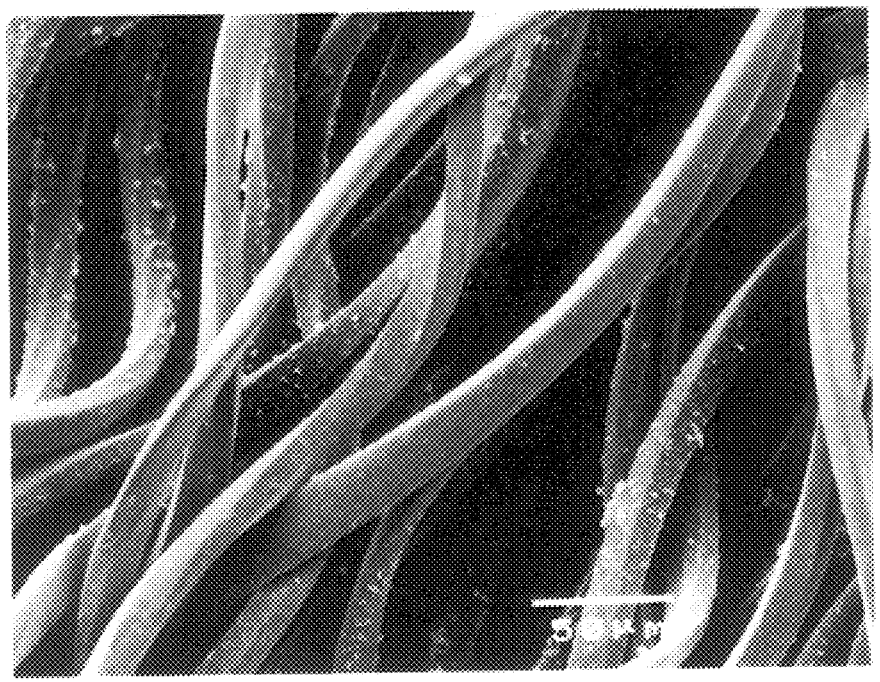
FIG. 4 depicts a SEM of polyester fibers coated with pyrrole polymer particulates.

Samples of the products made in Example 3 were inspected in the Scanning Electron Microscope (SEM) to evaluate the degree of enhancement of particulate burden before and after coatings. The fibers in the uncoated nylon wipers appeared very clean (see FIG. 1). However, the coated nylon fibers showed extremely random irregular polymer particulates distributed over the surface of each fiber and in between fibers (see FIGS. 2). It was remarkably surprising that a uniform dissipative property was obtained throughout the entire length of each wiper considering the fact that the coatings are actually random and non-continuous. A similar non-uniform distribution of particles was also seen in the case of the polyester fibers (FIG. 4). The uncoated polyester fibers also appeared very clean (FIG. 3). Interestingly, the overall macroscopic appearance of the coated surface was very uniform. Accordingly, aesthetics were nicely maintained in the process in spite of an extremely random microscopic distribution of the coating particulates.

Another surprising observation was the fact that although the particulate distribution on the fibers was very non-uniform, the overall coatings were tested and determined to be quite substantive (i.e., adhered strongly to the surface of the fibers). The substantive nature of the coating is a primary factor in these products being suitable for use in cleanroom applications. No particle shedding was observed during actual wiping applications.

Example 5

In this example, thiophen was used for the coating. 950 mL of deionized water was added to a clean steel tray. In two separate beakers, 0.75 g of 2,6-Naphthalenedisulfonic acid, disodium salt and 0.60 g of potassium persulfate were each dissolved separately in 5 mL deionized water. Both of these ingredients were subsequently slowly added to the water. While the entire solution was being stirred in an orbital shaker, 30 drops of monomeric thiophen was added slowly. Four 9"×9" pieces of nylon wipers were placed in the solution and the entire contents stirred for more than 4 hours at room temperature. Even after such an extended period of operation, the color of the wipers did not change at all. The wipers were taken out, washed thoroughly and tested for ESD dissipative properties. No change in ESD dissipative property was noticed in the treated fabrics. The resistivity reading was in the range of $10^{+14}\Omega$. The result appears to indicate that thiophen is an ineffective monomer for this particular process under these operating conditions.

Example 6

ESD dissipative nylon wipers were prepared by adding the following ingredients together and running the reaction for 25 minutes at room temperature.

a. 600 mL deionized water in a clean steel tray b. 1 g aniline hydrochloride c. 2 mL concentrated hydrochloric acid d. 2.5 g 2,6-Naphthalenedisulfonic acid, disodium salt, predissolved in 5 ml water e. 1.5 g potassium persulfate predissolved in 5 ml water; and f. 4 pieces of 9"×9" nylon wipers After 25 minutes of orbital shaking, the color of the wipers changed to dark green. The wipers were removed from the tray and rinsed well with deionized water containing drops of a surfactant (Triton-X®).

The resistivity of the coated wipers was in the range of $10^{+8}\Omega$ to $10^{+9}\Omega$. Accordingly, aniline monomers are suitable for use in the process.

Example 7

A method for producing ESD dissipative wipers on a larger scale was developed using the experimentation as exemplified in Examples 1 through 6. Experimental runs were carried out using the following procedures:

First, a paddle tank (capacity of 140 gallons) was cleaned with sodium hydroxide solution. The tank was rinsed thoroughly with water.

Using a computer automation program, the following steps were conducted.

The tank was first filled with 140 gallons of water, the temperature being maintained at 70° F. 270 g of 2,6-

Naphthalenedisulfonic acid, disodium salt was first predissolved in one gallon of water taken out from the tank and subsequently added back into the tank. In another vessel, 270 g of potassium persulfate was predissolved in one gallon of water (also taken out from the tank) and subsequently poured back into the paddle tank. Both of the chemicals were allowed to mix well for 2 minutes. 550 mL of neat pyrrole solution was then added directly to the tank and mixing continued for another 2 minutes.

Right after the completion of the addition and mixing of all the chemicals, 30 pounds total of nylon and polyester materials in the form of precut 9"×9" wipers were added to the tank. The mixing was then allowed to run at room temperature for 2 hours with the direction of the mixing in the tank being changed every 2 minutes. The directional change allowed for thorough mixing of the solution and the fabrics.

At the end of the treatment, all of the fabrics appeared dark grayish black. The liquid was allowed to run out and the fabrics were rinsed three times with a fresh supply of water. After rinsing, the wipers were removed using a basket and the excess water was extracted out by use of a centrifuge. The wipers were then dried in a dryer at 100° F.

The surface resistivity of the coated nylon wipers changed from $10^{+14}\Omega$ to $10^{+5}\Omega$, whereas resistivity obtained on the surface of the coated polyester wipers was in the range of $10^{+8}\Omega$ to $10^{+10}\Omega$. From an aesthetic point of view, the surfaces of all the wipers appeared to be uniformly black. This example demonstrates the commercial production of ESD safe wipers by using the topical polymerization process.

Example 8

To determine the optimum time necessary for the production of ESD dissipative wipers, the above Example 7 was repeated using the same chemicals, water and materials in the same proportions. However, wipers, both nylon and polyester, were removed at different intervals of time and examined to determine the extent of reduction in surface resistivities. In each case, two wipers, one polyester and one nylon, were taken out, washed in water and dried. In the case of the nylon wipers, the following results were obtained:

| Time of Treatment | Surface Resistivity $\Omega$ | Remark |
| --- | --- | --- |
| 1 Hour | $10^{+14}$ | Insulative |
| 1 Hour 15 Minutes | $10^{+14}$ | Insulative |
| 1 Hour 25 Minutes | $10^{+11}$ | ESD Dissipative |
| 1 Hour 35 Minutes | $10^{+8}$ | ESD Dissipative |

The polyester wipers were found to be in the range of $10^{+9}\Omega$ to $10^{+10}\Omega$ after one hour 35 minutes of treatment time. Samples of polyester wipers taken out 10 minutes earlier, were found to be in the range of $10^{+12}\Omega$, hence still insulative. This confirms the earlier finding that polyester wipers take longer to coat than nylon wipers.

This example demonstrates that under a set of operating conditions, the time of treatment can be varied in order to achieve the desired dissipative range. The example also shows it is possible to provide products which are either very close to ESD dissipative (i.e., resistivities $<10^{+11}\Omega$) or very close to being totally conductive (i.e., having resistivities $<10^{+4}\Omega$).

Cleanroom garments can be made using fabrics similar to those used for making the cleanroom wipers. It is believed that the invention is also useful in creating anti-static plastic gloves, cleanroom stationery products, cleanroom swabs and other cleanroom products.

The above description of the invention is intended to be illustrative and not limiting. Various changes or modifications in the embodiments described may occur to those skilled in the art. These can be made without departing from the spirit or scope of the invention.

What is claimed is:

1. A method of making an anti-static cleanroom product comprising the steps of:
    (a) contacting a cleanroom product substrate material with an aqueous solution containing:
        (i) a monomer capable of forming a conductive polymer,
        (ii) conductive polymer particles, or
        (iii) mixtures thereof; thereby coating said substrate; and
    (b) removing said substrate from said solution to result in a discontinuous conductive polymeric particulate coated anti-static cleanroom product.

2. A Method as recited in claim 1, wherein said contacting is a batch process.

3. A Method as recited in claim 1, wherein said contacting is a continuous process.

4. A Method as recited in claim 1, wherein said contacting is for a period of time ranging from about 0.5 to about 2 hours.

5. A Method as recited in claim 1, wherein said solution further comprises an oxidizing agent.

6. A Method as recited in claim 1, wherein said solution further comprises a counter ion.

7. A Method as recited in claim 1, wherein said substrate material comprises a polymer selected from the group consisting of polyester materials and nylon materials.

* * * * *